United States Patent

[11] 3,624,621

[72] Inventor Gerald J. Moser
Yorba Linda, Calif.
[21] Appl. No. 45,739
[22] Filed June 12, 1970
[45] Patented Nov. 30, 1971
[73] Assignee North American Rockwell Corporation

[54] FOLDED BACKGROUND PLANE FOR INTERSTITIAL CONDUCTORS
3 Claims, 2 Drawing Figs.

[52] U.S. Cl. .................................................... 340/174 PW, 340/174 GP, 340/174 HP, 340/174 TF, 340/174 PW
[51] Int. Cl. ...................................................... G11c 11/04, G11c 11/16
[50] Field of Search ............................................ 340/174 GP, 174 PW

[56] References Cited

UNITED STATES PATENTS 3,553,648 1/1971 Gorman et al. ............... 340/174 PW

*Primary Examiner*—James W. Moffitt
*Attorneys*—L. Lee Humphries, H. Fredrick Hamann and Robert G. Rogers

ABSTRACT: A metal plate at the terminations of interstitial conductors comprising part of plated wire memory, is folded back and secured to the outer surface above the plated wire memory for forming a ground plane for the interstitials. The metal plate may be formed on the flexible substrate on which the interstitials were formed.

INVENTOR.
GERALD J. MOSER

BY Robert G. Rogers
ATTORNEY

FOLDED BACKGROUND PLANE FOR INTERSTITIAL CONDUCTORS

BACKGROUND OF THE INVENTION

1. Field of the Invention

The invention relates to a ground plane for interstitial conductors of a plated wire memory and, more particularly, to such a ground plane comprising a metal plate which is folded back and secured to the outer surface of the plated wire memory.

2. Description of Prior Art

In the usual case, interstitial conductors between plated memory wires are soldered together at a common point and connected to ground. In other processes, a layer of metal is deposited on the end surface of the plated wire memory to interconnect the interstitial conductors.

It is preferred that the interstitial conductors be interconnected together at a common point in order to facilitate connection of all the interstitials to one common ground. As is well known, interstitial conductors are formed between plated memory wires of a plated wire memory for reducing electrical interference between wires so that the memory capacity can be increased without increasing its physical dimensions.

SUMMARY OF THE INVENTION

Briefly, the invention comprises a process and the resulting product for providing a ground plane which is common to interstitial conductors between tunnels of a plated wire memory mat. The tunnels are ordinarily filled with plated memory wires for implementing a plated wire memory.

In one embodiment, the ground plane comprises a metal plate at the terminations of the interstitial conductors. The metal plate is folded back onto the outer surface of the plated wire memory and is secured to that surface. An adhesive or other suitable means may be used to secure the plate to the surface.

In one process, the plate and the connections to the interstitials, are etched from the same conducting metal layer etched in forming the interstitial conductors. The plate connecting conductors and interstitial conductors are formed on an insulating substrate. Preferably, the substrate is flexible for permitting the plate to be folded back onto the outer surface.

Therefore, it is an object of this invention to provide an improved means for interconnecting interstitial conductors of a plated wire memory at a common point.

It is another object of this invention to provide an improved ground plane for interstitial conductors of a plated wire memory mat.

A still further object of this invention is to provide a ground plane for interstitial conductors comprising a metal plate at the terminations of interstitial conductors which is folded back and secured to the outer surface of a plated wire memory.

A still further object of the invention is to provide an improved ground plane for interstitial conductors formed by etching a metal plate and interconnecting conductors from the conducting metal layer etched to form interstitial conductors and folding the metal plate back onto the outer surface of the plated wire memory.

A further object of the invention is to provide a process for forming a ground plane for interstitial conductors on a flexible substrate which can be easily folded back and secured onto the outer surface of the plated wire memory.

These and other objects of the invention will become more apparent when taken in connection with the description of the drawings, a brief description of which follows:

DESCRIPTION OF PREFERRED EMBODIMENT

Figure 1:
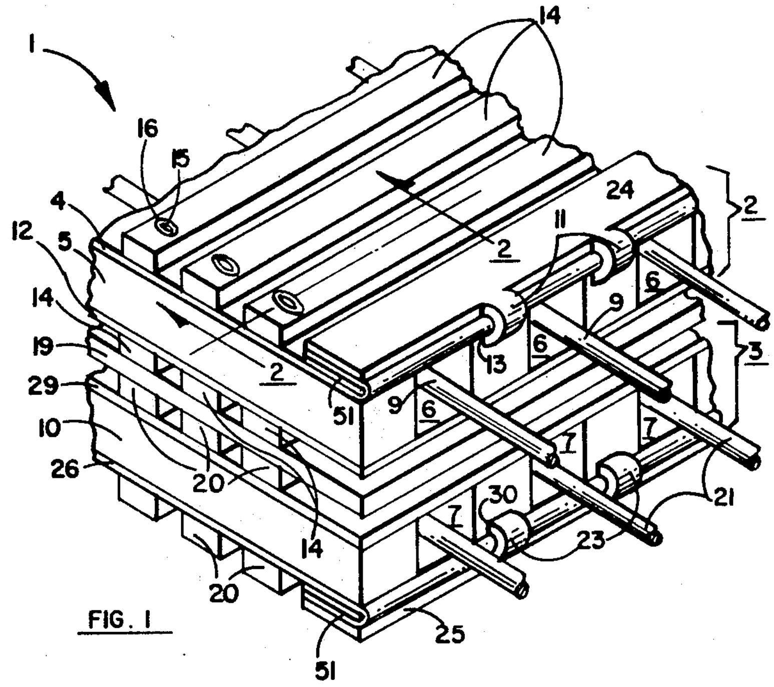
FIG. 1 is a perspective view of one embodiment of a plated wire memory showing metal plates secured to the outer surface of a plated wire memory to provide a ground plane for the interstitial conductors.

FIG. 1 is a perspective view of one end of a double-layered plated wire memory 1 comprising a first plated wire memory layer 2 and a second plated wire memory layer 3. The two memory layers are separated by an insulating substrate 19 which may be comprised of epoxy glass or an equivalent dielectric material.

The first memory layer 2 includes word straps 14 on both its surfaces. The word straps are electrically connected via plated through holes 15 along one edge of the memory layer. The word straps are disposed on the outer surfaces orthogonally to the tunnels 6.

Plated memory wires 9 in the tunnels are used to store information at bit locations determined by the intersection of the word straps and the plated memory wires. Although not shown, the plated memory wires 9 and the plated memory wires 21 of memory layer 3 are electrically connected at the opposite end of the double-layer plated wire memory 1. For example, a hairpin like connection may be used. The electrical connections between the memory wires provide the memory 1 with an increased storage capacity.

The plated memory wires may be comprised of a beryllium copper core coated by a magnetically retentive layer comprised of a nickel-iron alloy. The plated memory wires may also be coated by an insulating film if preferred.

The tunnels 6 are formed between insulating layers 5 which are formed between substrates 4 and 12. The substrates 4 and 12 as well as other substrates of the double-layered plated wire memory 1 may be comprised of epoxy-glass, polymide, or other dielectric materials. Preferably, the substrates are relatively flexible to enable the interstitial ground plates 24 and 25 to be folded back and secured to the outer surfaces of the plated wire memory layers 2 and 3 as described subsequently.

The second plated wire memory layer 3 is similarly comprised of word straps 20 on both surfaces of the memory layer. The word straps are orthogonal to the plated memory wires 21 and tunnels 7. The word straps are formed on substrates 26 and 29. Plated through holes 27 (see FIG. 2) may be used to interconnect word straps. The interconnected word straps provide electrical continuity around the plated memory wires.

The word straps may be masked and etched or otherwise formed form copper layers or other conducting metal layers on the outer surfaces of the substrates. In some embodiments, nickel layers may be used. In addition instead of etching, the word straps may be deposited on the substrate surfaces.

The tunnels 7 are formed between insulating layers 10 between substrates 26 and 29. Insulating layers 10 and 5 of both memory layers 2 and 3 may be formed by etching an epoxy-glass layer partially through; molding a resinous of equivalent material on an epoxy-glass substrate, a polyimide substrate, etc., etching an epoxy-glass layer completely through a polyimide substrate and by other process variations.

The processes for forming the structure shown in FIG. 1 as well as for forming other similar structures which can use the folded background plates 24 and 25 can be seen by referring to patent applications entitled: Interstitial Conductors Between Plated Memory Wires, Ser. No. 45,678 filed June 12, 1970. Interstitial Conductors Between Plated Memory Wires, Ser. No. 45,738 filed June 12, 1970. Conductors Between Plated Memory Wires, Ser. No. 45,677 filed June 12, 1970 and A Process For Forming Interstitial Conductors Between Plated Memory Wires Ser. No. 45,737 filed June 12, 1970, by Joseph M. Shaheen and John Simone.

The present development relates to ground plates 24 and 25 secured to the outer surfaces of memory layers 2 and 3 by adhesive layers 51 and 51' between the folded part of substrates 4 and 26 respectively. The thickness of the plate 24, adhesive layer 52, and the folded layer 4 are substantially equal to the height of the word straps 14 for maintaining the planar aspects of the plated wire memory. The ground plate 25 has the same planar characteristics relative to word straps 20.

Each ground plate 24 and 25, has connecting conductors 11 and 23 respectively which provide electrical continuity to the interstitial conductors 13 and 30 of the plated memory layers 2 and 3. The interstitial conductors are more clearly seen in FIG. 2.

Preferably, the substrates 4 and 26 are flexible for enabling the ground plates and the connecting conductors to be folded back and bonded or otherwise secured to the outer surfaces of the double-layered plated wire memory 1. If the substrates are not flexible, they can be removed, for example by etching, or cut to enable the plates to be easily folded back. A supporting substrate is not essential to the process or resulting product.

In one process embodiment, the ground plates 24 and 25 are formed during the process for forming the interstitial conductors. When the conducting metal layers from which the interstitials are formed are being etched, the areas for the plates and the connecting conductors are also masked. As a result, when the conducting metal layer, such as copper, is etched to form the interstitials, the ground plates and connecting conductors are also formed. Subsequently, the plates which are formed on the same substrates that support the interstitial conductors are folded back and secured to the outer surfaces as previously described herein.

In operation, or when the plated wire memory 1 is electrically connected, the plates are grounded. An external connector or terminal to the ground plates may be used as a common ground for one or more systems. Therefore, noise and other electrical interference which may exist between the plated memory wires are shunted to ground.

Figure 2:
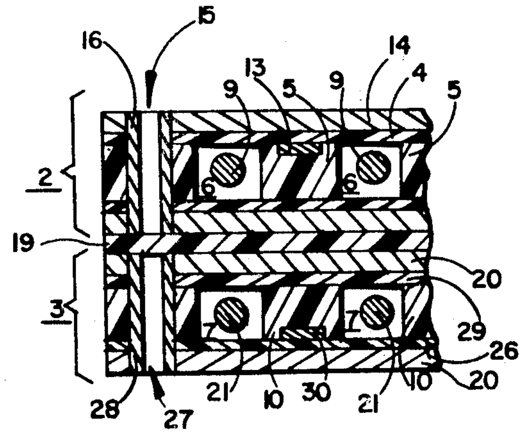
FIG. 2 is a cross-sectional view taken from lines 2—2 of FIG. 1 showing the interconnection of the word straps of the plated wire memory and interstitial conductors between tunnels for plated memory wires.

FIG. 2 is a cross-sectional view of FIG. 1 double-layer plated wire memory taken along lines 2—2. The plated through holes 15 and 27 with plated metal layers 16 and 28, respectively, are shown interconnecting the word straps of both plated wire memories 2 and 3. Plated memory wires 9 and 21 are shown in tunnels 6 and 7, respectively. interstitial conductors 13 and 30 are shown disposed on the substrates 4 and 26 of both memory layers.

It is pointed out that the etched metal layer may be a copper foil laminated to an insulating substrate such as polymide having a thickness of approximately 2 mils. The foil may typically be one ounce copper. Other examples are also given herein as well as in the referenced patent applications.

I claim:

1. A ground plane for interstitial conductors between plated memory wires of a plated wire memory, said ground plane comprising, a flexible substrate, a conducting metal plate disposed on said flexible substrate including conductors interconnecting said metal plate with said interstitial conductors, said interstitial conductors being disposed on said flexible substrate with said conducting metal plate, said conducting metal plate being folded back from the plane of interstitial conductors and secured to the outer surface of said plated wire memory.

2. The invention as stated in claim 1, wherein:

the memory tunnels in an insulating portion thereof, said tunnels lying in a plane parallel to the plane of the interstitial conductors.

3. The invention as stated in claim 2, including:

word-straps which lie in a plane orthogonal to the direction of said tunnels and which are attached to the flexible substrate.

* * * * *